AUTOMATIC FREQUENCY CONTROL SYSTEM FOR SIDE-BAND RECEIVERS

Filed Feb. 12, 1964

1

3,331,025

AUTOMATIC FREQUENCY CONTROL SYSTEM FOR SIDE-BAND RECEIVERS

René Rameau, Paris, France, assignor to CSF—Compagnie Generale de Telegraphie Sans Fil, a corporation of France Filed Feb. 12, 1964, Ser. No. 344,279
Claims priority, application France, Feb. 13, 1963, 924,600, Patent 1,356,380
7 Claims. (Cl. 325—419)

The present invention relates to automatic frequency control devices and more particularly to such devices used for the demodulation in sideband transmission.

Receivers including an automatic frequency control system and adapted to receive with adequate fidelity independent sideband signals, generally operate according to the following principle:

The carrier, whose frequency has been suitably translated, for example by means of a local oscillator, is isolated from the sidebands. Its frequency is then compared, after filtering, with the fixed frequency of a reference oscillator in a phase or frequency discriminator. An error voltage is thus obtained and is used to control the local oscillator frequency. The reference oscillator signal is also used for demodulating the sidebands which are filtered by sideband filters.

The drawback of this arrangement is that it requires a compromise, which is generally not satisfactory, between a rapid response to abrupt frequency fluctuations of low amplitude and a slow response continuously acting to limit frequency drifts.

It is an object of the invention to insure an almost instantaneous correction of small frequency fluctuations and a slower correction continuously tending to reduce frequency drifts, this correction being efficient enough to maintain those drifts within acceptable limits.

To this end, a frequency control system according to the invention comprises a local oscillator for translating the carrier frequency, a reference oscillator whose frequency is compared by means of a discriminator with the translated frequency thus obtained, the discriminator being, for example, a phase discriminator whose output voltage feeds a first varicap, which controls said reference oscillator, and a second varicap, which controls said local oscillator, and a variable capacitor, governed by a motor operated by said output voltage, and which is associated with said local oscillator to complete the action of said varicaps.

The invention will be best understood from the following description and appended drawings, in which.

Figure 1:
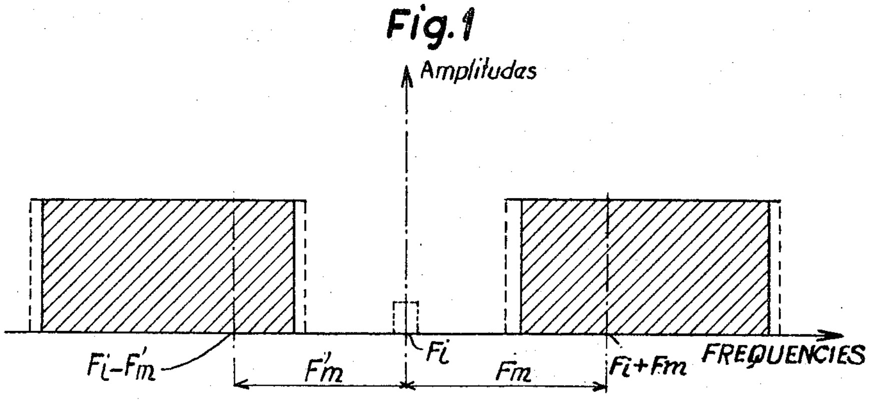
FIG. 1 shows the frequency spectrum of an independent sideband receiver.

In FIG. 1, the frequencies of the input signals of an independent sideband receiver are plotted along the abscissae and the amplitudes along the ordinates. The carrier frequency undergoes rapid fluctuations, due for example to scintillations of the emitter and receiver quartz crystals. Such fluctuations do not exceed a few dozens of cycles per second.

On the other hand, the carrier undergoes slow drifts of a few hundred of cycles per 24 hours.

Because of the modulation, for example in telephony with frequencies ranging between 300 and 6,000 c./s., the frequency variation of the sidebands is much wider. However, the frequency of the sidebands undergoes the same scintillations and drifts as the carriers.

The amplitude of the sidebands being generally much higher than the carrier amplitude, the most of the power radiated by the transmitter is in the sidebands. The ratio

2 of the sideband energy to the carrier energy is, for example, 200 to 1 taken.

Figure 2:
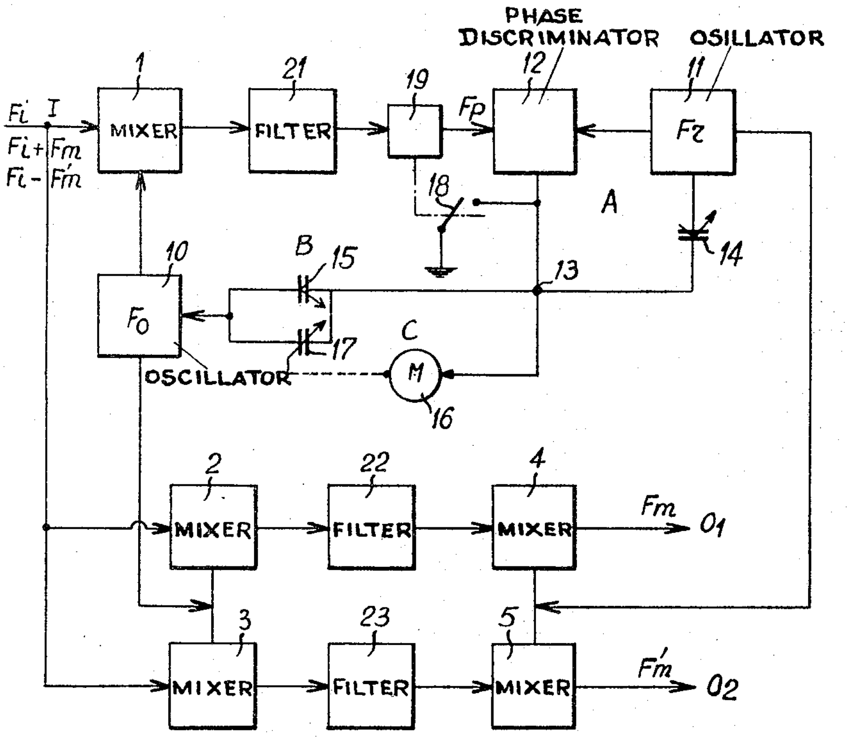
FIG. 2 is a block diagram of a system according to the invention.

FIG. 2 is a schematic diagram of an automatic frequency correction system according to the invention for an independent sideband receiver. The incoming signal is received at an input 1. It includes a carrier of frequency *Fi* and two symmetrical sidebands, whose frequencies are $Fi+Fm$ and $Fi-F'm$. The arrangement has two outputs $O_1$ and $O_2$, where the two sidebands are respectively collected.

The input signals feed simultaneously three similar mixers, 1, 2 and 3, whose respective second inputs are connected to a local oscillator 10, of nominal frequency *Fo*.

The output signals of mixers 1, 2 and 3, whose respective frequencies are $Fo-Fi$, $Fo-(Fi+Fm)$ and $$Fo-(Fi-Fm')$$

are, after amplification, passed to band-pass filters 21, 22 and 23.

Filter 21 has a very narrow band so as to pass, for example, $(Fo-Fi)\pm 50$ Hz.; the instantaneous value of the carrier frequency, thus translated, will be called F*p*.

Filters 22 and 23 have a much wider passband, say of 5700 cycles in telephony.

The outputs of filters 22 and 23 are coupled to the inputs of respective mixers 4 and 5, whose second inputs receive a signal at the reference frequency F*r*, provided by an oscillator 11. The signals at the respective outputs $O_1$ and $O_2$ of mixers 4 and 5 have the frequencies F*m* and F'*m*.

The frequency $Fr=Fo-Fi$ of oscillator 11 is controlled by means of phase discriminator 12. The latter has two inputs, respectively coupled to filter 21 and to oscillator 11, and one output 13, connected to the control input of oscillator 11. For example, output 13 is used for controlling a voltage responsive capacitance 14, for example of the diode or varicap type, inserted in the tuning circuit of oscillator 11. As is known, in such diodes, the capacitance between the electrodes varies with the applied voltage.

Output 13 is also connected to the control input of oscillator 10. For example, it is connected for controlling variable capacitances in parallel, 15 and 17, which belong to the tuning circuit of oscillator 10. Capacitance 15 is of the same type as capacitance 14. As to the variable capacitance 17, it is varied in an astatic manner, by a motor 16 controlled by the output voltage of the phase discriminator 12. Motor 16 is entirely conventional.

The respective frequencies of oscillators 10 and 11 are thus automatically controlled by means of the error voltage of phase discriminator 12, through three loops.

A loop A, comprising elements 12, 13 and 14, controls oscillator 11.

A loop B, comprising elements 1, 21, 12, 13, 15 and 10, controls oscillator 10, the action of this loop being completed by that of a loop C comprising elements 1, 21, 12, 13 and 17.

This adjustment of the system is such that, in stable state and when the frequency of the input signal is F*i*, i.e. the nominal frequency of the carrier, oscillators 10 and 11 oscillate at their nominal frequencies F*o* and $Fo-Fi$, the output error voltage of discriminator 12 being zero, motor 16 being at rest, and capacitor 17 in its intermediate position.

Under such conditions, the frequencies at outputs $O_1$ and $O_2$ are respectively equal to the modulation frequencies F*m* and F'*m*.

It is to be noted that loop A does not comprise any slow response component, such as filters, and has therefore a low time constant, so that the difference between frequency F*r* and the translated carrier frequency F*p* is cancelled quasi instantaneously. Accordingly, one may always write: $Fr=Fp$.

However, loop B comprises the narrow-band filter 21 and has therefore a higher time constant than loop A.

Let it be assumed that the nominal frequency $Fi$ abruptly varies by $\Delta F$.

The frequencies which are respectively applied to mixers 1, 2 and 3 become:

$$Fi+\Delta F$$
$$Fi+\Delta F+Fm$$
$$Fi+\Delta F-Fm'$$

Let the transitory equilibrium states resulting from the instantaneous action of loop A and from the less rapid action of loop B, be considered.

Varicap 15 attains more slowly than varicap 14 its equilibrium state.

A transitory state occurs between the moment when varicap 14 attains its equilibrium state and the moment when varicap 15 does so. The instantaneous frequency of oscillator 10 is at that stage $Fo+\Delta Fo$, where $\Delta Fo$ is lower than $\Delta F$ and is a function of time.

Due to the phase regulation achieved by loop A, one has at every instant:

$$Fr+\Delta Fr=(Fo+\Delta Fo)-(Fi+\Delta F) \quad (1)$$

Hence:

$$\Delta Fr=\Delta Fo-\Delta F \quad (2)$$

Under these conditions, the demodulation, which takes place in mixers 4 and 5, results in providing at outputs $O_1$ and $O_2$ signals of frequencies $Fm$ and $Fm'$.

Thus at output $O_1$ one finds:

$$(Fo-\Delta Fo)-(Fi-\Delta F+Fm)-(Fr-\Delta Fr)=Fm \quad (3)$$

taking into account Equations 1 and 2.

One may note that, when the frequency of the input signal varies by $\Delta F$, the output frequencies of mixers 1, 2 and 3 vary only by $\Delta F-\Delta Fo$, i.e. by a few cycles. Accordingly, the output signals of filters 21, 22 and 23 may be slightly attenuated.

Let now loop C be considered:

As soon as an error voltage appears at the output 13 of discriminator 12, motor 16 starts rotating and varies capacitance 17 until the error voltage becomes lower than the sensitivity threshold of motor 16.

By this time, the frequency of oscillator 10, has increased or decreased, with respect to its nominal value, by $\Delta F$, $\Delta F$ being the instantaneous value of the increase or decrease of the carrier frequency with respect to its nominal values.

Under these conditions, it can be seen that frequency drift $\Delta F-\Delta Fo$, that would subsist in filters 21, 22 and 23 without the action of loop C, is cancelled.

The demodulation by mixers 4 and 5 still results in providing at outputs $O_1$ and $O_2$ signals of frequencies $Fm$ and $Fm'$. On the other hand, the slow variation of capacitance 17 adds at every instant its action to that of the variations of capacitances 14 and 15, in achieving a state of equilibrium characterized by frequency drifts $\Delta F$ and $\Delta Fo$. The regulative action expected from capacitances 14 and 15 will thus be lessened; accordingly, the regulated state, corresponding to drifts $\Delta F$ and $\Delta Fo$, will be established more rapidly.

As shown in FIG. 1, the most of the energy transmitted is in the sideband or sidebands. Therefore it may happen, that the carrier will vanish in an intermittently manner, due for example to variable propagation conditions, while the sidebands will still be received with a sufficient level.

It is therefore necessary to preserve the adjustment existing at the moment the carrier vanished until the carrier has again a sufficient level for insuring the operation of the system.

There is shown in FIG. 2, a switch 18 which grounds terminal 13, whenever the carrier level is smaller than a predetermined threshold.

A threshold detector 19, preferably placed between filter 21 and discriminator 12, puts switch 18 in the desired position, through an electronic relay of small time constant.

The voltage at 13 being zero, frequency $Fr$ of oscillator 11 and frequency $Fo+\Delta Fo$ keep the values they had before the carrier vanished so that the regulation is normally resumed, as soon as the carrier reappears, without any interruption in reception.

It may be readily seen that in the system of the invention, the frequency of the sideband output signals is always equal to the incoming sideband signal frequency, when rapid phaseshifts occur due to the transmitter or receiver scintillations.

Accordingly, the system of the invention has the following advantages over conventional arrangements:

(a) The demodulation of the received signals remains in phase whatever the rapid carrier frequency fluctuations.

(b) If the carrier vanishes, the reception goes on with minimum drifts.

What is claimed is:

1. An automatic frequency control system for sideband receivers for receiving the carrier and at least one sideband, said system comprising an input for receiving said carrier and said sideband; a local oscillator including first means for rapidly varying the frequency thereof and second means for compensating slow frequency drifts; mixing means coupled to said input and to said local oscillator for deriving a translated carrier frequency signal; a reference oscillator including third means for rapidly varying the frequency thereof; discriminator means for comparing said translated carrier frequency and said reference oscillator frequency; said discriminator means having an output for providing an error voltage; and a first, second and a third feedback loop between said output and respectively said first, second and third means.

2. An automatic frequency control system for sideband receivers for receiving the carrier and at least one sideband, said system comprising an input for receiving said carrier and said sideband; a local oscillator including first means for rapidly varying the frequency thereof and second means for compensating slow frequency drifts; mixing means coupled to said input and to said local oscillator for deriving a translated carrier frequency signal; a reference oscillator including third means for rapidly varying the frequency thereof; discriminator means for comparing said translated carrier frequency and said reference oscillator frequency; said discriminator means having an output for providing an error voltage; and a first, second and a third feedback loop between said output and respectively said first, second and third means; and means for grounding said output upon said carrier level vanishing below a predetermined threshold level.

3. An automatic frequency control system for sideband receivers for receiving the carrier and at least one sideband, said system comprising an input coupling for receiving said carrier and said sideband; a local oscillator including a tuning circuit comprising a first voltage responsive capacitance and a variable capacitor; motor means for controlling said capacitor, said motor means having a control input; mixing means coupled to said input coupling and to said local oscillator for deriving a translated carrier frequency signal; a reference oscillator including a tuning circuit comprising a second voltage responsive capacitance; discriminator means for comparing said translated carrier frequency and said reference oscillator frequency; said discriminator means having an output for providing an error voltage; and a first, a second and a third feedback loop between said discriminator output and respectively said first capacictance, second capacitance and said control input.

4. An automatic frequency control system for sideband receivers for receiving the carrier and at least one sideband, said system comprising an input coupling for receiving said carrier and said sideband; a local oscillator including a tuning circuit comprising a first voltage responsive capacitance and a variable capacitor; motor means for controlling said capacitor, said motor means having a control input; mixing means coupled to said input coupling and to said local oscillator for deriving a translated carrier frequency signal; a reference oscillator including a tuning circuit comprising a second voltage responsive capacitance; discriminator means for comparing said translated carrier frequency and said reference oscillator frequency; said discriminator having an output for providing an error voltage; a first, a second and a third feedback loop between said discriminator means output and respectively said first capacitance, second capacitance and said control input; and means for grounding said output upon said carrier level vanishing below a predetermined threshold level.

5. An automatic frequency control system for sideband receivers for receiving the carrier and at least one sideband, said system comprising an input for receiving said carrier and said sideband; a local oscillator including first means for rapidly varying the frequency thereof and second means for compensating slow frequency drifts; first and second mixing means coupled to said input and to said local oscillator; means for respectively deriving a translated carrier frequency signal and said sideband; a reference oscillator including third means for rapidly varying the frequency thereof; discriminator means for comparing said translated carrier frequency and said reference oscillator frequency; said discriminator means having an output for providing an error voltage; a first, a second and a third feedback loop between said output and respectively said first, second and third means; further mixing means coupled to said second mixing means; and means for coupling said reference oscillator to said further mixing means.

6. An automatic frequency control system for sideband receivers adapted for receiving the carrier and at least one sideband said system comprising an input coupling for receiving said carrier and said sideband; a local oscillator including a tuning circuit comprising a first voltage responsive capacitance and a variable capacitor; motor means for controlling said capacitor, said motor means having a control input; first and second mixing means coupled to said input coupling and to said local oscillator; means for respectivly deriving from said first and second mixing means a translated carrier frequency signal and said sideband; a reference oscillator including a tuning circuit comprising a second voltage responsive capacitance; discriminator means for comparing said translated carrier frequency and said reference oscillator frequency; said discriminator means having an output for providing an error voltage; a first, a second and a third feedback loop between said output and respectively said first capacitance, said second capacitance and said control input; further mixing means coupled to said second mixing means; and means for coupling said reference oscillator to said further mixing means.

7. An automatic frequency control system for sideband receivers adapted for receiving the carrier and at least one sideband said system comprising an input coupling for receiving said carrier and said sideband; a local oscillator including a tuning circuit comprising a first voltage responsive capacitance and a variable capacitor; motor means for controlling said capacitor, said motor means having a control input; first and second mixing means coupled to said input and to said local oscillator; means for respectively deriving from said first and second mixing means a translated carrier frequency signal and said sideband; a reference oscillator including a tuning circuit comprising a second voltage response capacitance; discriminator means for comparing said translated carrier frequency and said reference oscillator frequency; said discriminator having an output for providing an error voltage; a first, a second and a third feedback loop between said output and respectively said first capacitance, said second capacitance and said control input; further mixing means coupled to said second mixing means; means for coupling said reference oscillator to said further mixing means; and means for grounding said output upon said carrier level vanishing below a predetermined threshold level.

No references cited.

KATHLEEN H. CLAFFY, *Primary Examiner.*

R. LINN, *Assistant Examiner.*